May 24, 1960 L. S. PELFREY 2,937,963
TEMPERATURE COMPENSATING ZENER DIODE CONSTRUCTION
Filed July 14, 1958
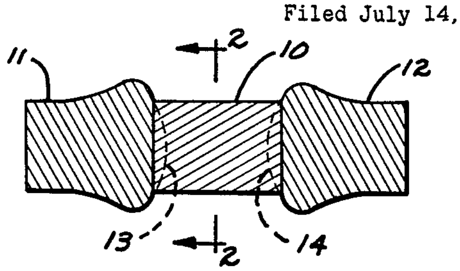
FIG 1
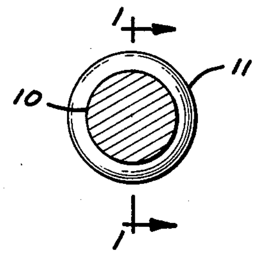
FIG 2
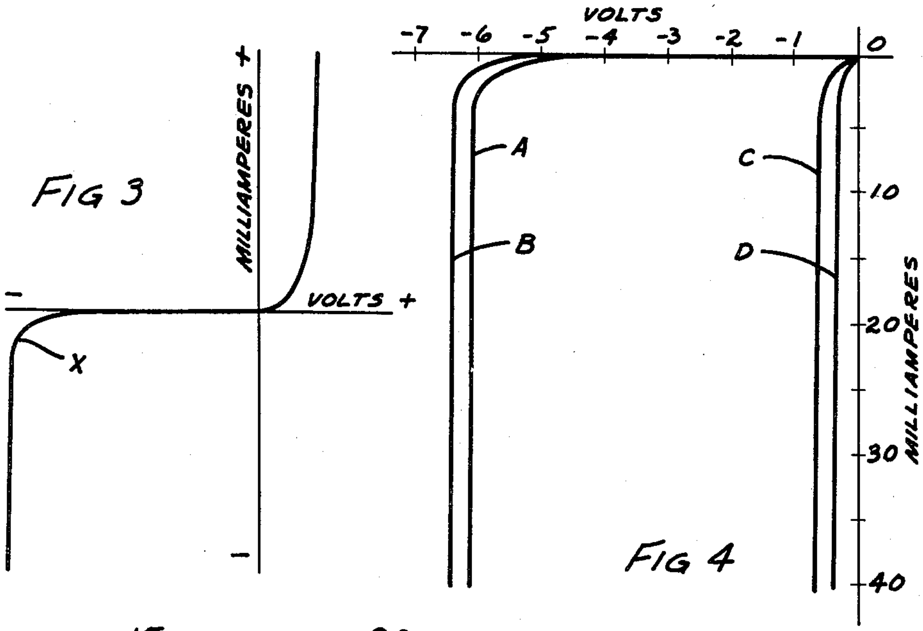
FIG 3, FIG 4
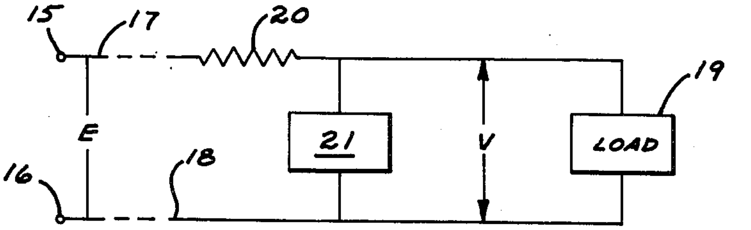
FIG 7
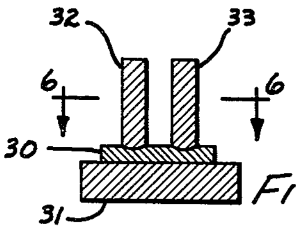
FIG 5
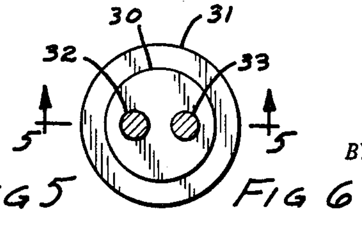
INVENTOR.
LOWELL S. PELFREY
BY D. Gordon Angus
ATTORNEY.

United States Patent Office 2,937,963

Patented May 24, 1960

2,937,963

TEMPERATURE COMPENSATING ZENER DIODE CONSTRUCTION

Lowell S. Pelfrey, Manhattan Beach, Calif., assignor to International Rectifier Corporation, El Segundo, Calif. a corporation of California Filed July 14, 1958, Ser. No. 748,456

9 Claims. (Cl. 148—33)

This invention relates to temperature-compensated electrical diode devices and has for its principal object to provide such a device capable of maintaining a substantially constant voltage across it over a wide range of temperature.

The invention is carried out by use of a mass of a semiconductor material connected with a pair of electrodes in such a manner as to form P–N junctions with each of these electrodes. This is a double junction diode arrangement with the two junctions opposed to each other.

The particular type of diodes used in the practice of this invention are those known as zener diodes. A zener diode is characterized by the fact that as the voltage across it in the reverse direction is increased from zero, there is substantially no current flow up to a critical voltage beyond which the reverse current flow suddenly increases very rapidly. Such a diode also has a corresponding characteristic in the forward direction, that is, with increase of voltage from zero there is little current flow until a rather critical forward voltage is reached beyond which the forward current increases very rapidly. The magnitude of the critical reverse voltage is much greater than that of the critical forward voltage. This characteristic of the zener diode has been utilized for voltage regulation. The type of semiconductor diode which is most pronounced in regard to the zener effect is the silicon junction diode; and for this reason the silicon junction type has been commonly used for regulation.

A disadvantage of the silicon zener diode as a regulator, however, has been that its critical voltage at which the current flow suddenly increases, varies somewhat with change of temperature. This creates some degree of instability as a voltage regulator to the extent of the voltage-temperature variation. In the reverse direction, the critical voltage increases with increase of temperature, and in the forward direction the critical voltage decreases with increase of temperature. The consequence of this is that for a given current flow in the reverse direction, the voltage across the diode increases with increasing temperature and in the forward direction the voltage across the diode decreases with increasing temperature.

By the use of the double zener diode arrangement with its two diodes opposed to each other, the same current flows through both, one in the forward and the other in the reverse direction. The temperature-voltage characteristics of the respective diodes in the two directions are substantially equal and opposite to each other, so that the voltage variation with temperature of one of the pair of diodes compensates for that of the other, thereby resulting in an overall characteristic which is substantially independent of temperature variation. This renders the double diode an especially effective regulating device substantially independent of temperature over a wide range of temperatures.

Since the two junctions of the double diode are located in the same semi-conductor crystal, they are maintained at the same temperature, which insures proper temperature compensation. Furthermore, the use of a single crystal for the two junctions enhances the obtaining of similar temperature characteristics in the two junctions.

The foregoing and other features of the invention will be better understood from the following detailed description and the accompanying drawing, of which:

Fig. 1 is a cross-section view of a double zener diode taken at line 1—1 of Fig. 2, in accordance with the present invention;

Fig. 2 is a cross-section view taken at line 2—2 of Fig. 1;

Fig. 3 shows a typical voltage-current characteristic of a single zener diode;

Fig. 4 shows voltage-current characteristics of a zener diode at different temperatures in both the forward and reverse directions;

Fig. 5 shows a cross-section view of a modified form of double zener diode in accordance with the present invention taken at line 5—5 of Fig. 6;

Fig. 6 shows a view partially in cross-section taken at line 6—6 of Fig. 5; and Fig. 7 illustrates a circuit in which a double zener diode in accordance with this invention is used for voltage regulation.

Referring to Figs. 1 and 2, there is shown a wafer or bar 10 of semi-conductor material, here considered to be silicon crystal, to the opposite ends of which are fused as by welding, respective lengths or bars 11 and 12 of a metal such as aluminum. This can be done in a well-known manner at an elevated temperature of, for example, about 1100° C., so that the aluminum becomes diffused in, and alloys with, the silicon. In accordance with accepted theory, there are created by this fusing, respective P–N junctions 13 and 14 at the regions where the aluminum fuses into the silicon. In the use of silicon and aluminum metal in this manner, the silicon is of the N-type, and the aluminum is P-type material. Thus, the P–N junctions at the two ends or sides of the silicon are opposed to each other in direction or polarity. In consequence when voltage is applied across the double junction of Fig. 1, as by connecting into a circuit the elements 11 and 12, constituting the terminals of this double junction, current is caused to flow through the two junctions in series, this current being in the forward direction of one of the junctions and in the reverse direction of the other.

A typical voltage-current characteristic of a single one of such P–N junctions, is shown in Fig. 3, wherein it appears that upon application of even a relatively small voltage in the forward direction, the current rapidly increases with increase of forward voltage, whereas in the reverse direction a much larger reverse voltage is required before any substantial current increase is obtained, after which the current increases very rapidly. It is noted that there is a fairly well-defined point or region of voltage in the reverse direction at which the current suddenly and rapidly increases from an insignificant value to a relatively large value. Thus, the silicon junction diode is seen to possess a very high back resistance up to its critical reverse breakdown or zener voltage. At this point, the back resistance drops to a very small value. In this region, the current will increase very rapidly, while the voltage drop across the diode remains almost constant. This characteristic of the diode of suddenly allowing a relatively large amount of current to flow after the critical voltage has been reached, has been called the zener or avalanche effect, and is thought to be due to a form of breakdown of the junction at this voltage. Since the voltage at which the effect occurs is quite well defined, the zener characteristic of the diode has been used for voltage regulation.

It is known, however, that temperature variations produce a change of the zener characteristic, that is, the critical or breakdown voltage changes with change of temperature. This temperature effect is illustrated in Fig. 4, wherein the abscissas represent voltage and the ordinates represent current through the diode. Curve A shows the reverse characteristic for a typical silicon crystal diode which is held at a temperature of 25° C. It is seen that for this particular diode the breakdown voltage occurs at approximately 6 volts and that the maximum voltage which can be developed across it is about 6.1 volts which is substantially reached at about ten milliamperes. Even though the current increases many fold beyond the ten milliamperes, the reverse voltage does not increase substantially beyond the 6.1 volts.

Curve B shows the reverse characteristic for the same diode at a temperature of 150° C., from which it is seen that the maximum reverse voltage of about 6.2 volts is reached at a current flow of about 6 milliamperes, and that the current flow increases many fold without further appreciable rise of voltage. Thus, the difference in voltage from the temperature of 25° C. to 150° C. is approximately one-tenth volt at any given reverse current flow beyond the critical value.

Curves C and D represent the voltage-current characteristics of the same diode in the forward direction at 25° C. and at 150° C., respectively. Although curves C and D are shown for convenience of comparison at the negative part of the graph, it should be understood that they actually represent positive values of voltage and current, as in the case of the positive part of the curve shown in Fig. 3. The reason for showing curves C and D in the negative portion is to enable them to be compared more readily with the curves A and B. It is observed that curves C and D bear very much the same relationship to each other as curves A and B, in the sense that the major portion of curves C and D are parallel to each other and approximately one-tenth volt apart.

From the foregoing facts, it will be recognized that the characteristics of curves C and D are compensating in respect to the characteristics of curves A and B, insofar as temperature is concerned. Assuming for example that there is a current of 20 milliamperes flowing through the double diode of Fig. 1 and that the temperature of the double diode is 25° C., the total voltage across the double diode is 6.8 volts, 6.1 volts of which is across the diode which is operating in the reverse direction and .7 volt of which is across the diode which is operating in the forward direction. When the diode is at the temperature of 150° C. there is still 6.8 volts across the double diode for a 20 milliampere current flow, but in this case, 6.2 volts is across the diode operating in the reverse direction and only .6 volt is across the diode operating in the forward direction. If there had been used a single diode as in the conventional case, instead of the double diode according to the present invention, the voltage for a 20 milliampere current flow through it would have changed from 6.7 volts at 25° C. to 6.8 volts at 150° C.

While the specific example of the graph of Fig. 4 has been given for illustrative purposes, it will be understood that different double diodes made differently may give somewhat different specific results so far as actual critical voltages and actual variations of voltage with temperature are concerned. The compensating effect will nevertheless be present as has been described in connection with the graph of Fig. 4.

While the invention has been specifically described with reference to a zener diode device comprising N-type silicon and P-type aluminum, it will be understood that many other forms of zener diode may be used instead. For example there are many metals or substances other than aluminum which can be fused with the N-type silicon to form a P–N junction. For example, boron can be diffused into N-type silicon at a high temperature of around 1100° C. at the region of the junction, and a suitable terminal lead can be connected at this region. In general metals in group III of the periodic table can be used, as well as alloys including such a metal. Furthermore, it is not necessary to use N-type silicon, as zener diodes can be made from P-type silicon. This can be done, as is well known, by diffusing a donor impurity, for example, arsenic into P-type silicon to create a P–N junction. The various ways of forming P–N junctions with N-type or P-type silicon are well known and need no discussion here.

In general any kind of silicon junction will exhibit the zener effect and is usable in the present invention. While the specific example of zener diode given in this specification has its zener voltage in the neighborhood of 6 volts, it will be understood that the zener voltage may vary from a very small voltage to a much larger voltage. In general, the zener voltage of a silicon diode is determined by the resistivity of the crystal, which in turn is due in large measure to the manner and materials with which the crystal has been "doped" during its formation. It is well understood in the art how to dope semi-conductor crystals with impurities during their formation to produce particular resistivity with particular resultant zener characteristics. While all silicon junction diodes are characterized by the zener effect, they are not commonly used as zener diodes for regulating or reference units at extremely high zener voltages, owing to the great power loss which would be consumed by a substantial current flow at a high voltage. While diodes made from other semi-conductor material than silicon are capable of exhibiting the zener effect, it is most pronounced in silicon-type diodes, which is the reason silicon is ordinarily the semi-conductor used for a zener diode. Furthermore, silicon is subject to the voltage variation with temperature to a much greater extent than other semi-conductors, which tends to make the double diode arrangement more effective with silicon than with other semi-conductors.

Figs. 5 and 6 show another form of double zener diode in accordance with the invention in which the two P–N junctions are at the same side of the semi-conductor crystal material. The crystal 30 is mounted on a base 31, as by welding; and the material of the base is preferably a metal of good heat conductivity and substantial mass as compared with the mass of the crystal so that it acts as a heat sink. Elements 32 and 33 form the two terminals for the double diode, and these correspond with terminal elements 11 and 12 respectively of Fig. 1; that is, they are attached to the upper surface of semi-conductor 30 in a manner similar to that explained in connection with Fig. 1. Thus, for N-type silicon, for example, the elements 32 and 33 can be aluminum or other group III element or alloy, fused to the crystal to form respective P–N junctions. Where the crystal is P-type, the terminal elements 32 and 33 can be applied in the same manner described above for the application of terminal elements to form P–N junctions with P-type semi-conductor. It will be recognized that connection of the terminals 32 and 33 into a circuit will cause operation in a manner similar to that of the connection of terminal elements 11 and 12 of Fig. 1 into circuit.

Fig. 7 shows a simple circuit in which a double zener diode according to this invention can be used as a voltage regulator, or reference unit. A source of voltage E is assumed to be connected across terminals 15 and 16 of an electric line having conductors 17 and 18 from the respective terminals; and the voltage is applied to a load 19 through a resistance 20. A double zener diode 21 according to this invention is connected across the load at points 22 and 23, between the load and the resistance. These points 22 and 23 may correspond respectively with the terminal elements 11 and 12 of Fig. 1, for example.

Assuming that the double diode 21 has the characteristics shown in Fig. 4, then it is apparent that the D.C.

voltage V appearing across points 22 and 23 will be maintained at 6.8 volts over a wide temperature range of 25° C. to 150° C. If, for instance, the voltage E were to rise somewhat, and thereby tend to increase the voltage V across the load, such tendency would simply result in an increase of the current flowing through the double diode which would cause more current to flow through resistance 20 and thereby develop enough voltage drop across resistance 20 to compensate for the increase due to increased voltage E. The converse would be true in the event the voltage E should tend to drop and thereby tend to reduce the voltage across the load.

It will be understood that by the present invention, I provide a novel form of unitary double zener diode construction which is self-compensating for changes of temperature over a wide temperature range. Since the construction is unitary, all parts of the double diode will be maintained at the same temperature, regardless of the fact that the junction operating in the forward direction is creating less heat than the junction operating in the reverse direction. It is apparent that more heat will be generated at the junction operating in the reverse direction than at the junction operating in the forward direction because the reverse voltage is much greater than the forward voltage while the current through the two junctions is always the same. The invention is not limited except in accordance with the appended claims.

I claim:

1. A double zener diode of the type whose means of connection into external circuitry consists of two terminals said diode comprising a mass of semi-conductor material selected from the group consisting of N and P types and having two sides, a first conductive material in contact with a first of said sides and providing a P–N junction at said first side, and a second conductive material in contact with the second of said sides and providing a P–N junction at said second side, the two P–N junctions being opposed to each other in polarity, said first and second conductive material constituting said two terminals respectively, a first of said junctions providing a voltage-current characteristic in the direction of reverse current flow which varies with the temperature of the diode, and the second of said junctions providing a voltage-current characteristic in the direction of forward current flow which also varies with the temperature of the diode, the said variations due to temperature, of the two voltage-current characteristics compensating each other.

2. A double zener diode unit of the type whose means of connection into external circuitry consists of two terminals, said diode unit comprising a mass of semiconductor crystal material selected from the group consisting of the N and P types and having two sides, a first conductive material in contact with a first of said sides, and a second conductive material in contact with the second of said sides, both of said conductive materials being of the same type in respect to N and P and being of opposite type to the type of said semi-conductor material, whereby a P–N junction is formed at each of said sides, said first and second conductive materials constituting said two terminals respectively, a first of said junctions providing a voltage-current characteristic in the direction of reverse current flow which varies with the temperature of the diode, and the second of said junctions providing a voltage-current characteristic in the direction of forward current flow which also varies with the temperature of the diode, the said variations due to temperature, of the two voltage-current characteristics compensating each other.

3. A double zener diode unit of the type whose means of connection into external circuitry consists of two terminals, said diode unit comprising a silicon crystal having two sides, and a first metallic material fused to one of said sides and a second metallic material fused to the other of said sides, each of said of two metallic materials forming a P–N junction at its respective side of the crystal, said metallic materials both being of the same type in respect to their P–N nature, and the crystal being of the opposite type, whereby the two junctions are opposed to each other in polarity, said first and second conductive materials constituting said two terminals respectively, a first of said junctions providing a voltage-current characteristic in the direction of reverse current flow which varies with the temperature of the diode, and the second of said junctions providing a voltage-current characteristic in the direction of forward current flow which also varies with the temperature of the diode, the said variations due to the temperature, of the two voltage-current characteristics compensating each other.

4. A double zener diode unit of the type whose means of connection into external circuitry consists of two terminals, said diode unit comprising N-type silicon crystal having two sides, a first mass of aluminum fused to one of said sides and a second mass of aluminum fused to the other of said sides, both of said masses of aluminum forming P–N junctions at their respective sides of the crystal, said junctions being opposed to each other in polarity, said first and second masses of aluminum constituting said two terminals respectively, a first of said junctions providing a voltage-current characteristic in the direction of reverse current flow which varies with the temperature of the diode, and the second of said junctions providing a voltage-current characteristic in the direction of forward current flow which also varies with the temperature of the diode, the said variations due to the temperature, of the two voltage-current characteristics compensating each other.

5. A double zener diode unit of the type whose means of connection into external circuitry consists of two terminals, said diode unit comprising a mass of semiconductor material selected from the group consisting of N- and P-type, two electrically conductive substances separated from each other and in contact with said semiconductor material, each of said substances providing a P–N junction at said semi-conductor material, the two P–N junctions being opposed to each other in polarity, said two electrically conductive substances constituting said two terminals respectively, a first of said junctions providing a voltage-current characteristic in the direction of reverse current flow which varies with the temperature of the diode, and the second of said junctions providing a voltage-current characteristic in the direction of forward current flow which also varies with the temperature of the diode, the said variations due to the temperature, of the two voltage-current characteristics compensating each other.

6. A double zener diode unit of the type whose means of connection into external circuitry consists of two terminals, said diode unit comprising a mass of semi-conductor crystal material of the N- or P-type, two separated electrically conductive materials in contact with said crystal material, both of said conductive materials being of the same type in respect to N and P and being of opposite type to the type of said semi-conductor material, said two electrically conductive substances constituting said two terminals respectively, a first of said junctions providing a voltage-current characteristic in the direction of reverse current flow which varies with the temperature of the diode, and the second of said junctions providing a voltage-current characteristic in the direction of forward current flow which also varies with the temperature of the diode, the said variations due to the temperature, of the two voltage-current characteristics compensating each other.

7. A double zener diode unit of the type whose means of connection into external circuitry consists of two terminals, said diode unit comprising a silicon crystal, two metallic materials separated from each other and fused to said crystal, each of said two metallic materials forming a P–N junction at the crystal, said metallic materials both being of the same type in respect to their P–N nature and the crystal being of the opposite type, whereby the two junctions are opposed to each other in polarity, said two metallic materials constituting said two terminals respectively, a first of said junctions providing a voltage-current characteristic in the direction of reverse current flow which varies with the temperature of the diode, and the second of said junctions providing a voltage-current characteristic in the direction of forward current flow which also varies with the temperature of the diode, the said variations due to the temperature, of the two voltage-current characteristics compensating each other.

8. A double zener diode unit of the type whose means of connection into external circuitry consists of two terminals, said diode unit comprising N-type silicon crystal, two masses of aluminum fused to said crystal at separate positions of said crystal, each of said masses of aluminum forming a P–N junction at the crystal, said junctions being opposed to each other in polarity, said first and second masses of aluminum constituting said two terminals respectively, a first of said junctions providing a voltage-current characteristic in the direction of reverse current flow which varies with the temperature of the diode, and the second of said junctions providing a voltage-current characteristic in the direction of forward current flow which also varies with the temperature of the diode, the said variations due to the temperature, of the two voltage-current characteristics compensating each other.

9. A double zener diode of the type whose means of connection into external circuitry consists of two terminals, said diode unit comprising a mass of semi-conductor material selected from the group consisting of N- and P-types, a first conductive material and a second conductive material in contact with said semi-conductor material at separated positions thereof, each of said conductive materials providing a P–N junction at its respective position, and a heat-conducting material serving as a heat sink attached to another position of said semi-conductor material, said first and second conductive materials constituting said two terminals respectively, a first of said junctions providing a voltage-current characteristic in the direction of reverse current flow which varies with the temperature of the diode, and the second of said junctions providing a voltage-current characteristic in the direction of forward current flow which also varies with the temperature of the diode, the said variations due to the temperature, of the two voltage-current characteristics compensating each other.

References Cited in the file of this patent

UNITED STATES PATENTS

| | | |
|---|---|---|
| 2,721,965 | Hall | Oct. 25, 1955 |
| 2,781,481 | Armstrong | Feb. 12, 1957 |
| 2,801,375 | Losco | July 30, 1957 |
| 2,811,682 | Pearson | Oct. 29, 1957 |
| 2,829,999 | Gudmundsen | Apr. 8, 1958 |
| 2,854,366 | Wannlund et al. | Sept. 30, 1958 |
| 2,862,840 | Kordalewski | Dec. 2, 1958 |

OTHER REFERENCES

"Handbook of Semiconductor Electronics," Hunter; McGraw-Hill Book Company, New York, N.Y., 1956, pages 4–28, 4–29, 4–30.